United States Patent [19]

Middleton

[11] Patent Number: 4,679,338
[45] Date of Patent: Jul. 14, 1987

[54] SNOW REMOVAL SYSTEM WITH ADJUSTABLE SNOW IMPELLER GATE

[76] Inventor: Carlisle A. Middleton, 38 Dungarrie Rd., Baltimore, Md. 21228

[21] Appl. No.: 879,254

[22] Filed: Jun. 27, 1986

Related U.S. Application Data

[63] Continuation-in-part of Ser. No. 764,712, Aug. 12, 1985, Pat. No. 4,597,203.

[51] Int. Cl.$^4$ ............................................. E01H 5/00
[52] U.S. Cl. ........................................ 37/244; 37/259
[58] Field of Search ......................... 37/225, 241–244, 37/259, 260, 262; 56/13.3, 13.4, 17.3, 16.7, 16.9, 17.5, 320.1, 320.2

[56] References Cited

U.S. PATENT DOCUMENTS

| | | | |
|---|---|---|---|
| 2,151,491 | 3/1939 | Washburn | 37/259 |
| 2,605,561 | 8/1952 | Maynard et al. | 37/259 |
| 2,977,694 | 4/1961 | Higby | 37/243 |
| 2,993,321 | 7/1961 | Hester | 37/243 |
| 3,131,491 | 5/1964 | Durrschmidt | 37/243 |
| 3,562,932 | 2/1971 | Rautio | 37/243 |
| 4,150,501 | 4/1979 | Hayashi | 37/260 |

*Primary Examiner*—E. H. Eickholt
*Attorney, Agent, or Firm*—John F. McClellan, Sr.

[57] ABSTRACT

A snowblower with a power driven intake and discharge fan in a housing has at the front an open face exposing the fan and a transition housing detachably attachable over the open face. The transition housing has a slidable plate or fan cover that rises and can be positioned to leave substantially a snow-height opening at the lower front for most efficient intake of snow by the fan. The transition housing has a concave, radiused lower margin for scooping snow into the circular opening.

9 Claims, 4 Drawing Figures

SNOW REMOVAL SYSTEM WITH ADJUSTABLE SNOW IMPELLER GATE

This is a continuation-in-part of my co-pending application for U.S. patent, Ser. No. 764,712, filed 8-12-85 for CONVERTIBLE SNOWBLOWER USING RECTANGULAR SHROUD INTERFACE now U.S. Pat. No. 4,597,203.

FIELD OF THE INVENTION

This invention relates generally to snow removers and specifically to powered snow blowers.

BACKGROUND OF THE INVENTION

My said U. S. Pat. No. 4,597,203 discloses a system for many uses including snow and leaf removal. It provides a wheel-supported motor-driven fan in a rectilinear housing that has an open front for vacuum intake of material to be blown from a discharge either free of the machine or into a bag.

Snow or leaves can be drawn directly into the open front in a preferred embodiment.

Means are provided also in various embodiments for closing off the open front selectively to perform various specific tasks, one means being a plate that adjusts vertically to modify suction pickup that is from directly below.

In rigorous testing of the snow removal capability of the machine described in my U.S. Pat. No. 4,597,203, I found that it performed perfectly as designed in all respects except that light snow of an inch or two (2.5 to 5 cm) depth tended to blow away from the intake under some circumstances.

SUMMARY OF THE INVENTION

To insure picking up snow of the finest, lightest kind of snow in addition to deep snow, I made modification of my invention described in the present application. By this new invention I match the pickup or suction area to the depth of snow in such a way as to apply the full force of the blower suction to snow at the intake.

In addition, I provide an improved, co-acting intake impeller blade or blower blade or fan blade design that traps snow in the blower and discharges it as intended without tending to blow back any part of it in a forward direction.

Objects of the invention are therefore to provide a snow removal system that can be instantly and positively adjusted to match height of the intake opening to the depth of snow, for greatest pickup effectiveness, and that employs a novel blade design for the blower or intake impeller that coacts with the intake opening adjustment to prevent loss of snow in the vicinity of the housing.

Further objects are to provide a system as described that by means of a transition or transition housing member is additionally compatible with the system of my said U.S. Pat. No. 4,597,203, that is easy and economical to manufacture and to use, and that is durable and efficient.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
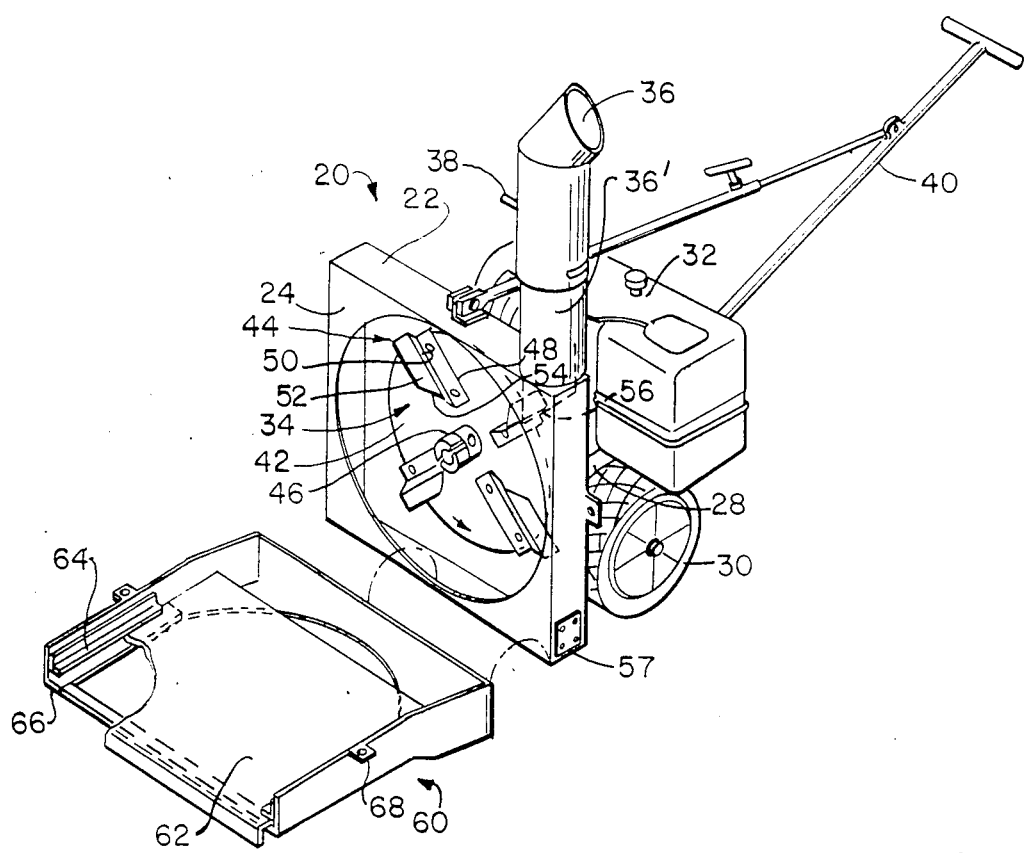
FIG. 1 is an isometric, partially exploded view of a preferred embodiment of the invention.

FIG. 1 shows aspects of importance in the invention, a transition member that adapts the improvements for use with my said U.S. Pat. No. 4,597,203 to match intake opening height to snow depth, an improved fan or blower blade design that co-acts with it, and simple means for advantageously modifying the housing of my said prior invention of U.S. Pat. No. 4,597,203.

These aspects are shown and described in reverse order.

First, the basic power unit of snowblower unit 20 is slightly modified over the unit shown in my said U.S. Pat. No. 4,597,203 in that the housing 22 is provided with a circular open face 24 concentric with the axis of and slightly smaller than the fan or blower that had a square opening before. The housing may be slightly thinner than before, bringing snow two inches (5 cm) closer to the fan. This provides, in combination with the other aspects of the invention, a more efficient mechanism and operation. Other parts of the basic unit include a frame 28 on two wheels 30 and an engine 32 as a drive for the fan or impeller or blower 34, a discharge duct 36 that is orientable through a 180° arc side to side around the front by handle 38. Handle 40 is for guidance and control. All these aspects except those noted as new are incoporated by reference from my said U.S. Pat. No. 4,597,203.

Second, the fan, although similar in having a circular back plate 42 on which the vanes are fixed, has new vanes 44 that form pockets. Rotation is countr-clockwise (arrow) as the observer faces the open front of the housing 22. Each vane 44 is riveted or otherwise fixed in a direction radial to the hub 46 (which hub has a slot on the axial fact that serves to connect and drive other equipment as described in my said U.S. Pat. No. 4,597,203. Each vane has the form in sectional view of a right-angled "Z", with a first leg 48 flat against the back plate or disk 42. A second leg 50 is perpendicular to the disk, and a third leg 52 extends forwardly parallel to leg 48 in the direction of rotation, forming the pocket described that retains snow against forward escape from the housing.

The base or inner end of each vane is radially spaced from the hub and is formed with a 45° angle as at 54, the angle being cut back from the vane third leg of the Z across the second and first legs for best vane efficiency. This vane configuration draws snow, grass and other material free of the corners of the housing so that no circular contour structure is necessary in the housing around the blower. The vane pockets hold debris and it can't come back out again except at the discharge.

The discharge duct 36 has a downward extension 56 from the lower part 36', which in contrast with the circular section upper part 36, is square in cross-section. The extension is from the inboard and extends to within ¼ inch (6 mm) of the fan blades, serving as a stripper plate to keep snow from continously revolving with the fan past the discharge duct 36.

Plate 57 is held by screws over an opening in the housing that can be used for leaf (and light snow) blowing as described in my said U.S. Pat. No. 4,597,203, and for this the stack 36 may be closed off by a cap, as described, and a stub tube may substitute for plate 57.

Third, a transition member 60, shown tipped forward free of the snow blower unit 20, to show details of operation and structure of the back face of it is attached to the housing 22 for scooping snow into the housing and has a gate 62 that adjusts up or down to match the height of the intake opening into the housing with the depth of snow to be taken in and then ejected through the blower duct 36. Thus means are provided for adjusting the upward extent of the intake opening to coincide with snow height on a said surface from which the snow is to be removed.

The gate 62 is shown partially broken away, for exposition. It slides vertically in grooves provided, between the two nested angle shapes 64, 66, on each side.

A perforate tab 68 or ear extends laterally from each side of the "U"-frame or transition 60 for attachment to the housing of the power unit 20. The lower end has a radius around 180° in the transition and is shaped to form a scoop in front.

Figure 2:
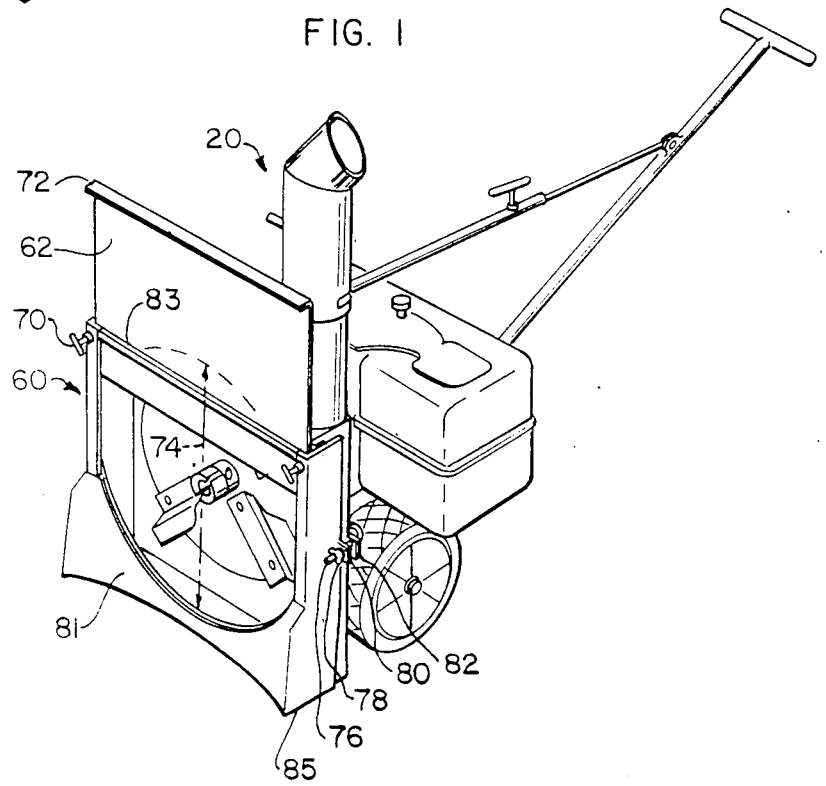
FIG. 2 is an isometric assembled view thereof with the gate in an upward position.

FIG. 2 shows the preferred embodiment 20 of the invention assembled and ready for operation with a snowfall of perhaps ten inches (25 cm) depth.

Gate 62 is adjustably set at the desired height by set screws 70, one at each side at the top of the transition 60. The upper edge 72 of the gate 62 is bent for stiffness and as a handle. The gate may be ⅛ inch (3 mm) thick aluminum. The gate 62 is preferably less high than the opening 74 so that a gap of about one inch (2.5 cm) is always open at the bottom to prevent engine overload. The set screws hold it by pressing on it; they are threaded into the angle at the face of the transition.

The transition 60 is attached to the housing as by conventional "J"-bolts 76, one at each side, tightened by a wing nut 78 on the threaded shank to draw each tab 80 to a similar tab 82 on the housing 22. A hole may be provided in the housing for the hooked end of each "J"-bolt to fit into.

The transition has a lower part or wear plate 85 that can ride as a shoe on the snow or other surface traversed, with the entire unit tipped slightly forward as indicated. This can be raised with the handle. The lower part of the intake at the scoop is ¾ inch (2 cm) from the ground, rides ½ inch (12 mm) off the ground and the scoop arc 81 at the bottom is spherically concave on the forward face to present a 45° slope to snow at all positions, for efficiency in taking in snow. A brace 83 may join the upper portions of the transition for strength and rigidity.

Figure 3:
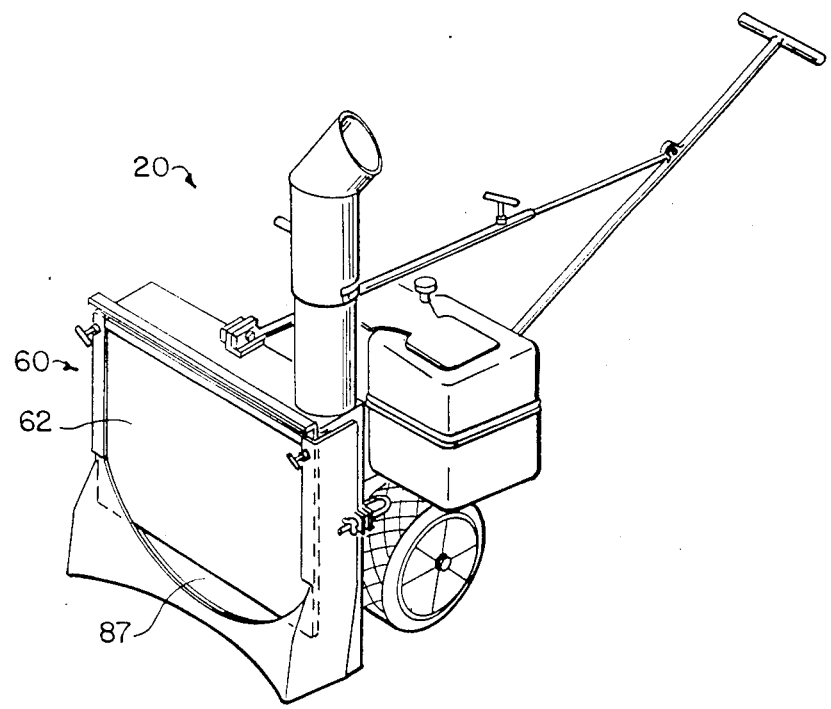
FIG. 3 is a view similar to that of FIG. 2, but with the gate in a downward position.

FIG. 3 shows the embodiment 20 with the gate 62 in a low position as for snow of a few inches depth.

Figure 4:
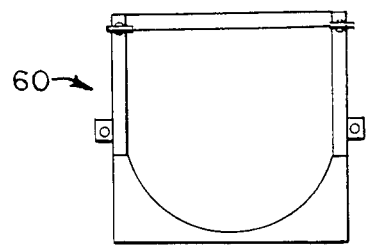
FIG. 4 is a front elevational view of a transition member.

FIG. 4 shows the transition 60 in the front elevational view.

Material for the invention may be aluminum or steel. The housing circular opening may best be a fraction of an inch to an inch (2.5 cm) smaller in diameter from the blower or fan. Although the invention has been described in the context of a two wheel integrally powered unit, it will be appreciated that other versions can be provided in the spirit of the invention.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for removing material such as snow accumulated to a height on a surface, the system including:
   a frame,
   a means for powering said system attached at said frame,
   a plurality of wheels supporting the frame,
   a housing supported at the frame and defining an intake opening therein and defining a discharge opening, and
   means at the housing for intaking said material through the intake opening and discharging said material through the discharge opening, the improvement comprising:
   means for maximizing efficiency of said removal of material, including: the intake opening extending substantially upward from a lower portion thereof adjacent a said surface, means for adjusting the upward extent of said intake opening to coincide with said height of material on a surface, the means for adjusting comprising: a transition member, means for detachably attaching the transition member to the housing at said intake opening, means on the transition member for guiding, and a plate vertically movable on said means for guiding.

2. In a system as recited in claim 1, the means for adjusting further comprising structure for contacting said plate and fixing said plate in position.

3. In a system as recited in claim 2, said transition member having a "U"-shape at a lower portion thereof, and a concave shape around a lower portion for scooping in said material.

4. In a system as recited in claim 3, a brace across an upper portion of said "U"-shape.

5. In a system as recited in claim 1, the means for guiding including nested angles in a slot therebetween.

6. In a system as recited in claim 1, the plate having a handle thereacross, said handle comprising a bent portion of said plate.

7. In a system as recited in claim 1, said housing being rectilinear in shape and proportioned for leaning forward with said transition member for enabling said transition member to touch a said surface while removing material.

8. In a system as recited in claim 3, means for preventing overload damage to said powering means comprising said plate having a length proportioned for leaving open part of said plate having a length proportioned for leaving open part of said opening therebelow at all times.

9. In a system for removal of material such as snow and leaves, from a surface, the system having:
   a frame with front and rear,
   a plurality of wheels supporting the frame,
   a housing on the frame and having an intake for material and a discharge,
   an impeller in the housing in position for drawing a flow of material into the housing intake and expelling same through said discharge and powered means for driving the impeller, the improvement comprising: the housing being substantially upright and the housing intake being in a open vertical forward face of the housing; the housing being closed at the sides and having a vertical guide means adjacent the open vertical forward face, and means on the open vertical forward face for maximizing efficiency of said removal, including a plate vertically slidable over the intake on said vertical guide means for adjustably fixing vertical position of the plate relative to said open vertical foward face, and thereby adjusting said intake to a height corresponding to a height of material to be removed from a surface through said intake.

* * * * *